United States Patent
Kodavalla et al.

(10) Patent No.: US 7,620,660 B2
(45) Date of Patent: Nov. 17, 2009

(54) PRE-IMAGE LOGGING FOR DATABASE RECOVERY

(75) Inventors: Hanumantha R. Kodavalla, Sammamish, WA (US); Michael J. Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 11/171,746

(22) Filed: Jun. 30, 2005

(65) Prior Publication Data

US 2007/0005664 A1   Jan. 4, 2007

(51) Int. Cl.
  *G06F 17/30* (2006.01)
(52) U.S. Cl. .......................................... 707/202; 707/8
(58) Field of Classification Search ...................... 707/8, 707/202, 204; 711/161, 162
See application file for complete search history.

(56) References Cited

U.S. PATENT DOCUMENTS 5,832,508 A * 11/1998 Sherman et al. ............. 707/200
6,173,292 B1 * 1/2001 Barber et al. ................ 707/200
6,651,077 B1 * 11/2003 East et al. .................... 707/204
7,107,292 B1 * 9/2006 Hrle et al. .................... 707/202
2002/0091718 A1 * 7/2002 Bohannon et al. ........... 707/202
2006/0129611 A1 * 6/2006 Adkins et al. ................ 707/202
2008/0005191 A1 * 1/2008 Lashley et al. ............... 707/202

OTHER PUBLICATIONS

Mohan, C. et al., ARIES: A Transaction Recovery Method Supporting Fine-Granularity Locking and Partial Rollbakcs Using Write-Ahead Logging, *ACM Transactions on Database Systems*, 1992, 17(1), 94-162.

* cited by examiner

*Primary Examiner*—Hosain T Alam
*Assistant Examiner*—Amy Ng
(74) *Attorney, Agent, or Firm*—Woodcock Washburn LLP

(57) ABSTRACT

In order to provide recovery for a database stored on storage not meeting the WAL protocol requirements, for example, storage including a temporary cache and a second storage (e.g. an IDE disk with a temporary cache and a hard disk), a log is created including, for each changed page, a pre-image of the page before changes were effected. The log also includes one or more change log records logging changes made to the page. Periodic checkpoints occur in which the cached pages are flushed to the disk. Recovery proceeds with a redo pass through the active log and then with an undo pass, undoing any transactions that have not been committed.

20 Claims, 3 Drawing Sheets

PRE-IMAGE LOGGING FOR DATABASE RECOVERY

BACKGROUND

In many computer systems, the storage and retrieval of information for and by computer applications is handled by one or more central storage systems. For example, one type of storage system commonly used in personal computers is a file-folder-and-directory-based system, also termed a "file system." Such file systems organize pluralities of files into hierarchies to create an abstraction of the physical organization of the storage medium used to store the files. Generally, such organization into a hierarchy occurs at the operating system level. The files stored generally include the file hierarchy itself (the "directory") embodied in a special file maintained by the file system. This directory, in turn, maintains a list of entries corresponding to all of the other files in the directory and the nodal location of such files in the hierarchy (herein referred to as the folders).

The use of file system for central storage has several limitations. These may be overcome by using relational database technology as the underpinning of a central storage system. However, the use of relational database technology may introduce additional challenges in various aspects of the computer system.

One such challenge relates to the disk storage used by the computer system. Relational databases use various methods to recover from failures and guarantee transactional consistency. One group of methods for recovery includes the ARIES method (from "Algorithms for Recovery and Isolation Exploiting Semantics") and related methods. The ARIES method was first described in: Mohan, C., Haderle, D., Lindsay, B., Pirahesh, H., Schwarz, P. *ARIES: A Transaction Recovery Method Supporting Fine-Granularity Locking and Partial Rollbacks Using Write-Ahead Logging, ACM Transactions on Database Systems*, Vol. 17, No. 1, March 1992, pp 94-162. ARIES and related recovery methods generally rely on Write-Ahead Logging (WAL) protocol.

The WAL protocol is a specific and defined set of implementation steps necessary to ensure data is stored and exchanged properly and can be recovered to a known state in the event of a failure. Just as a network contains a defined protocol to exchange data in a consistent and protected manner, so too does the WAL describe the protocol to protect data.

The WAL, as defined in the ARIES article, "asserts that the log records representing changes to some data must already be in stable storage before the changed data is allowed to replace the previous version of the data in nonvolatile storage. That is, the system is not allowed to write an updated page to the nonvolatile storage version of the page until at least the undo portions of the log records which describe the updates to the page have been written to stable storage."

However, some ways of storing log records may not meet the requirements of the WAL protocol. For example, integrated drive electronic (IDE) drives may not meet the requirements of the WAL protocol. An IDE drive caches pages and does not guarantee that a page has safely made to disk. Thus the WAL protocol assertion that "the log records representing changes . . . must already be in stable storage before the changed data is allowed to replace the previous version of the data in nonvolatile storage" is not met by IDE drives. Because of this, at best some committed transactions may lose data and at worst results in an inconsistent database if the disk reorders the writes.

No guarantee regarding recovery using an ARIES-type recovery method can be made because this WAL protocol is not met. When the relational database issues a write of the log buffer, the IDE disk controller may return success without waiting for the written log contents to go to disk. Additionally, in using an IDE disk, there is no guarantee that the cache will be written out to disk in the order of the original writes.

Additionally, drives that are not battery-backed may cause torn pages, due to non-atomic writes. For example, if the database page size is 8 KB, but the disk being used does not guarantee the atomic write of an 8 KB page, a torn page may result. A power-failure in the middle of a disk write may result in a torn page, where some sectors of the page contain the previous images and others new images. Even if the relational database system can detect torn pages during recovery time, recovering the page requires restoring from backups which typically requires an administrator.

In view of the foregoing deficiencies in existing data storage and database technologies, there is a need for a recovery scheme that provides improved performance, for example when used with data storage devices which do not necessarily meet the WAL protocol. The present invention satisfies this need.

SUMMARY

In order to provide for database storage on data storage devices which do not necessarily meet the WAL protocol (such as IDE disks) a recovery log including, for a changed page (portion of a database), both a pre-image log record storing the contents of the page before the change and a update log record, storing information about the change are included. Additional update log records may indicate further changes to the page after the pre-image has been stored. Checkpoints periodically require that the data storage device flush any cached database pages. The handling of these checkpoints, in some embodiments, is performed in such a way as to allow concurrent processing of changes without a loss of consistency.

In order to recover a state of the database (e.g. for restart processing after a crash), the log is examined in chronological order. Any page for which a pre-image record found in the log is reinstated in the database in its pre-image form. Any successive log records which are update log records for a reinstated page are then applied to the reinstated page. An undo pass is then performed, in reverse chronological order, which undoes any changes which are a result of an uncommitted transaction.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
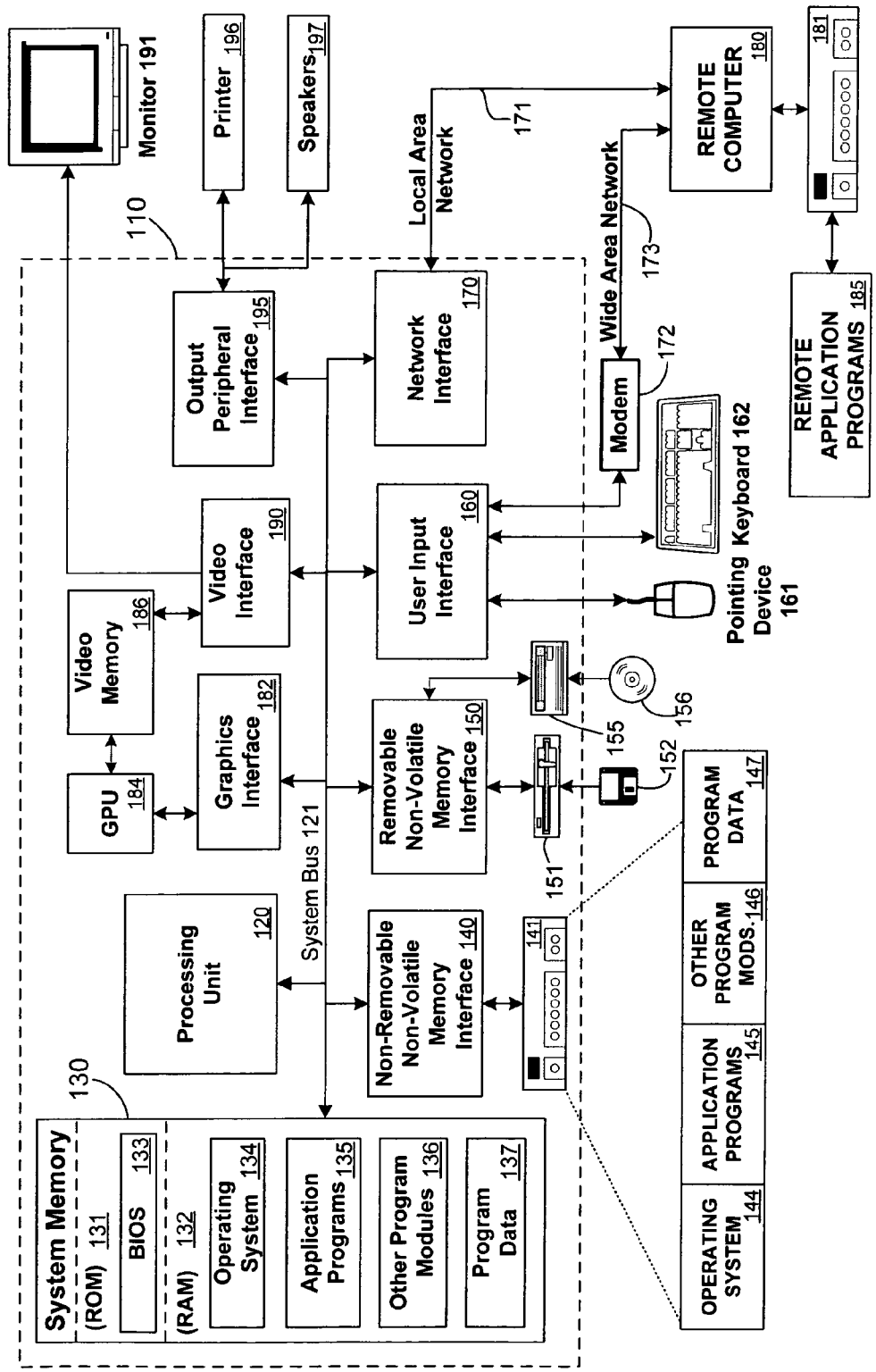
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Database Updates and Recovery

As described above, relational database technology can be used as the underpinning of a central storage system. When this occurs, it is possible that all or part of the actual storage of the relational database will be to hard disks. Such disks may contain temporary storage (a cache) and a more permanent storage. This is done in order to promote efficiency of input/output from the disk. Some data stored to the disk can be initially stored in the cache, and later moved to the more permanent storage (e.g. hard disks).

As described above, for ARIES-type recovery methods require adherence to the WAL protocol to guarantee successful recovery. While certain disks, for example, IDE disks, do not meet the WAL protocol, in some cases they do meet the following assumptions regarding the temporary caching of data before it is written out to more permanent memory (e.g. hard disk). These assumptions are (1) that a Flush-Cache call is honored, (2) that Multiple Flush-Cache requests are handled properly, and (3) that Flush-Cache concurrency with input/output commands is handled properly.

(1) Flush-Cache honored: The disk responds properly to a Flush-Cache command. The Flush-Cache command flushes the contents of the cache, writing any data which is to be stored to hard disk. When the Flush-Cache call returns, any information which is to be stored on the disk as the result of any writes issued before the Flush-Cache call will be written on the more permanent memory.

(2) Multiple Flush-Cache requests: The disk responds properly to multiple Flush-Cache requests. While, according to some embodiments of the invention, at most one Flush-Cache command issued by the file system is in progress at any time, there may be other applications on the machine that have issued the same command.

(3) Flush-Cache concurrency: A Flush-Cache command can run correctly even concurrently with other input/output (I/O) requests from the disk without causing any timing issues (e.g. hangs) or accuracy problems (e.g. corrupted writes).

While these assumptions may not be natively valid on all disks, they can be enforced by the operating system. For example, one operating system enforces serialization of the Flush-Cache request with other I/O requests.

Pre-image Logging

Before updating a page, its pre-image and the change are logged in that order. A page is written to disk only if its pre-image in the log is already on disk. Before updating a page, a log record containing the pre-image of the page is added to the log if it is not already present, an update log record is generated storing information regarding the changes made, and the page itself is updated.

Checkpoints are introduced which will periodically perform log maintenance. In order to allow consistency and concurrent operation, in some embodiments, a new synchronization point is created, called the log semaphore. This allows the log to be shared between the updaters (making changes to the database) and the checkpoint (periodically performing log operations.) This prevents the race condition where the page updater skips generating the pre-image because it is already in the active log but the checkpoint has decided to truncate the log. The updating logic according to one embodiment is shown in pseudocode form in Table 1:

TABLE 1

Updating Logic latch page in exclusive mode;
    acquire log semaphore in share mode;
    if (pre-image LSN < truncate LSN) and (not in redo-recovery) {
        release log semaphore;
        write a pre-image log record of the page;
        store the LSN as pre-image LSN in the buffer header;
    }
    else {
        release log semaphore;
    }
    write a log record to reflect the update to the page;
    update the page and mark it dirty;
    unlatch page;

As shown in Table 1, first the page to be changed is latched in exclusive mode, and then the log semaphore is acquired in share mode. If a log record containing the pre-image (before changes) of the page exists, its log sequence number ("pre-image LSN") is compared to the "truncate LSN", which indicates the beginning of the active log. If the pre-image LSN is not found or is not in the active log, and if the update is not part of a recovery, the log semaphore is released, and a pre-image log record is created for that page, and the log sequence number is stored for that pre-image LSN. If the pre-image LSN is found, or if the update is part of the redo pass of recovery (discussed below), then the log semaphore is released. This ensures that the pre-image LSN exists in the active log. An update log record is then added to the log in order to track the change to the page. The page itself is then updated (though this update, as discussed, does not necessarily conform to the WAL protocol). The page is marked "dirty" and then unlatched.

The log semaphore is held briefly only for testing the truncate LSN value and not while generating the log records. Additionally, updates to different pages can happen concurrently because they acquire the log semaphore in share mode. The log semaphore is obtained in exclusive mode only by the checkpoint and that too for a short duration at the beginning of the checkpoint.

Database transactions, including one or more page changes, may occasionally be rolled back. When such a rollback occurs, the log records associated with the rolled back transaction are undone. Compensation log records (CLRs) are generated. This is done exactly in the manner shown above for changes—the "undoing" of changes are themselves stored changes, and the logic above is used—if required a pre-image is logged.

Figure 2:
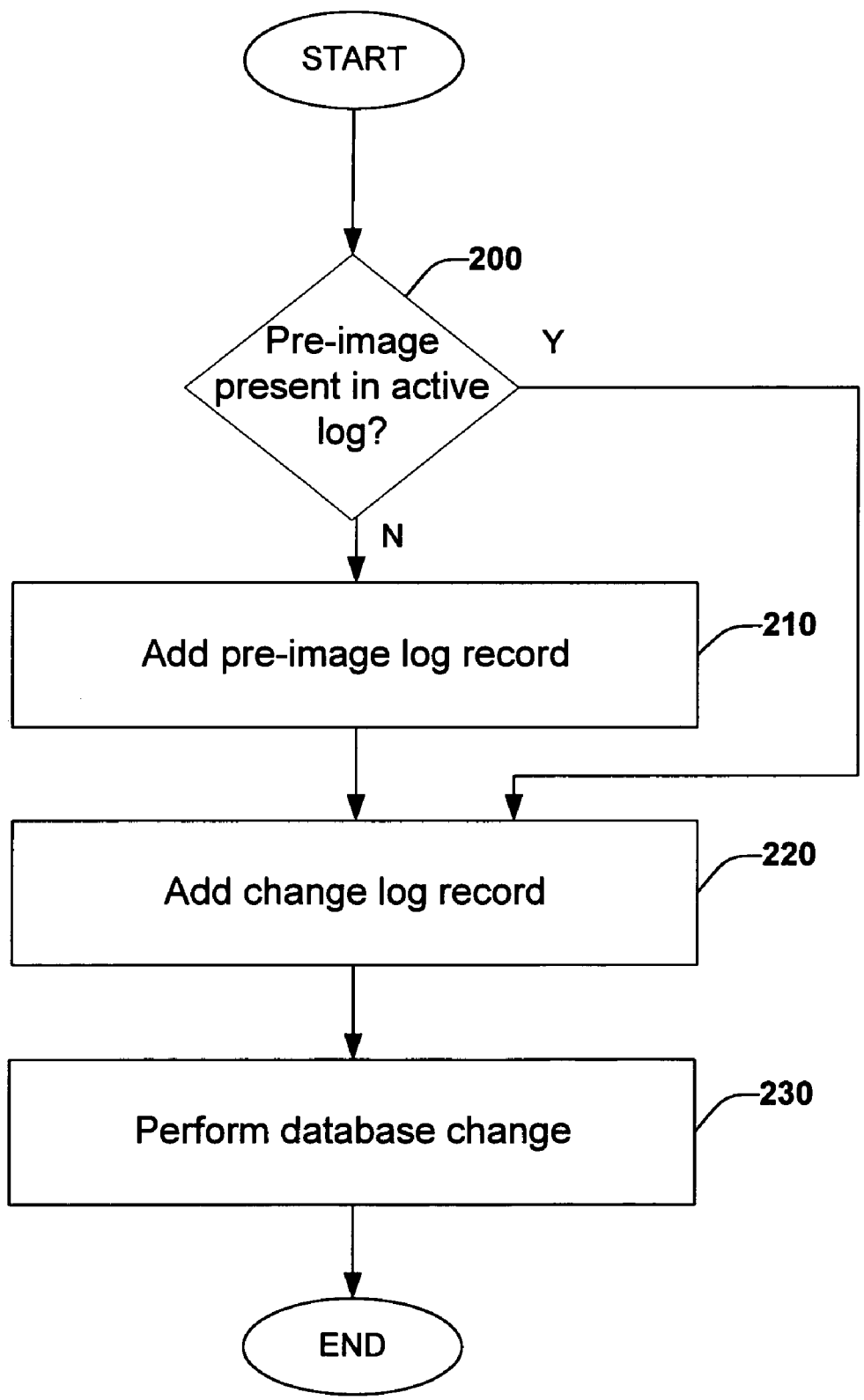
FIG. 2 is a flow diagram of a method for recoverably updating a database according to one embodiment of the invention.

FIG. 2 is a flow diagram of a method for recoverably updating a database according to one embodiment of the invention. As shown in FIG. 2, first, a determination is made as to whether a copy (pre-image) of the portion of the database to be updated is stored in the active portion of the recovery log, determination 200. If it is not, then a pre-image log record including a copy of the portion is added to the log, step 210. If determination 200 indicated that pre-image log record already exists in the active log, or after it is added in step 210, a update log record is added to the log in step 220. This update log record includes information about the change to the portion of the database. Then the database change can be made, step 230.

Checkpoints

Checkpoints are performed periodically in order to flush the log and database writes. Additionally, the size of the log is managed by checkpoints—when a checkpoint begins, if the active log size has exceeded a pre-specified threshold, the truncate LSN (which defines the active log) will be advanced to the LSN of the checkpoint, and at the end of the checkpoint, the log truncated. Such a checkpoint is called a log-truncating checkpoint.

When a checkpoint starts, it writes a begin-checkpoint log record to the log, flushes the log, issues a Flush-Cache command, and sets flush LSN (which defines the point on the log when the log and the cache have been flushed) to the LSN of the begin checkpoint log record. This flush LSN is used by the checkpoint and the lazy writer to determine if a dirtied page can be written out to the disk.

Only if the page's pre-image in the log is on disk (pre-image LSN<flush LSN), can that page be written out—this can be seen as analogous to ARIES WAL with respect to pre-images. The checkpoint logic according to one embodiment is shown in pseudocode form in Table 2:

TABLE 2

Checkpoint Logic acquire log semaphore in exclusive mode;
if (active log exceeded a threshold) {
make this a truncating checkpoint;
if (active transactions present)
    truncate LSN = the oldest active transaction's begin LSN;
else
    truncate LSN = current end of log;
}

TABLE 2-continued

Checkpoint Logic write begin checkpoint log record and include truncate LSN in the record;
release log semaphore;
flush the log up to current LSN;
//note that these writes do not necessarily reach disk.
flush-cache;        // all the writes issued till now reach disk.
acquire log semaphore in exclusive mode;
flush LSN = begin checkpoint log record's LSN;
release log semaphore;
for (each page in the buffer pool) {
acquire page latch in exclusive mode;
if (dirty && (pre-image LSN < flush LSN))
    write page;        // safe to write as pre-image is on disk
if (pre-image LSN < truncate LSN)
    set pre-image LSN to 0;        // forces next update to log pre-image
release page latch;
}
write end checkpoint log record;
flush the log till current end of log;
flush-cache;
update the boot page to point at the current checkpoint's begin log record;
flush-cache again so that the boot page reaches the disk;
copy the boot page to its mirror and write the mirror;
// this will definitely reach disk when the next checkpoint flushes
at the beginning;
if this is a truncating checkpoint, truncate the log till truncate LSN;

As shown in Table 2, first, the log semaphore is acquired in exclusive mode. If the active log exceeds the threshold, it will be a truncating checkpoint—the truncate LSN will then be set to the LSN of the log record corresponding to the oldest active transaction. If no active transactions exist, the truncate LSN will be set to the end of the log. A checkpoint log record is then written to the log. The log semaphore is released.

Next the log is flushed up to the checkpoint LSN. As discussed in the comment above, these writes will not necessarily reach the disk—this is because the disk controller may cache and return success without actually writing them to the permanent media. Then a flush-cache is called to flush all the writes issued till now are written to the permanent media.

Once the flush-cache completes, some record keeping occurs. First, the log semaphore is acquired, and the flush LSN is changed to indicate that the log has been flushed as of the beginning checkpoint record. Then for each page in the buffer pool—the pool of pages being used—the latch is acquired for the page, the page, if it is marked as dirty and the pre-image log record is in the flushed portion of the log, is written to disk (of course, the disk controller may keep this in its cache). If the pre-image is in the truncated portion of the log, the pre-image LSN for the page is set to zero. Thus, the next time this page is updated (as shown in the logic above, Table 1), a log record will be created with a pre-image for this page. The page latch is then released. The checkpoint end is marked with a checkpoint end log record. The log is then flushed again and another flush-cache issued to ensure all writes issued during the checkpoint have safely made to the disk The boot page, which will be consulted for a recovery, is updated to point at the current checkpoint's begin log LSN. Then flush-cache is called again to ensure the boot page is also safely written to the disk. Then the mirror of the boot page is updated but there is no need to issue flush-cache as in case of a failure recovery knows which mirror page is more up to date. If the log is to be truncated, the actual truncation then occurs.

The boot page contents are crucial for crash recovery and if the system crashes during the write of the boot page, the page may be torn causing recovery to fail. To avoid the problem, in one embodiment the boot page is mirrored on two pages, and on recovery the two pages are compared. At least one of them will be valid, since only one can be torn as a result of a crash during writing. If they both are valid but different, a crash has occurred between the mirroring, and the one with the higher LSN is used. In an alternate embodiment, the writes of the boot page is ping-pong-ed between the two pages—alternating which is written to when a boot page is created. In this way, the Flush-Cache at the end of the checkpoint can be omitted.

Figure 3:
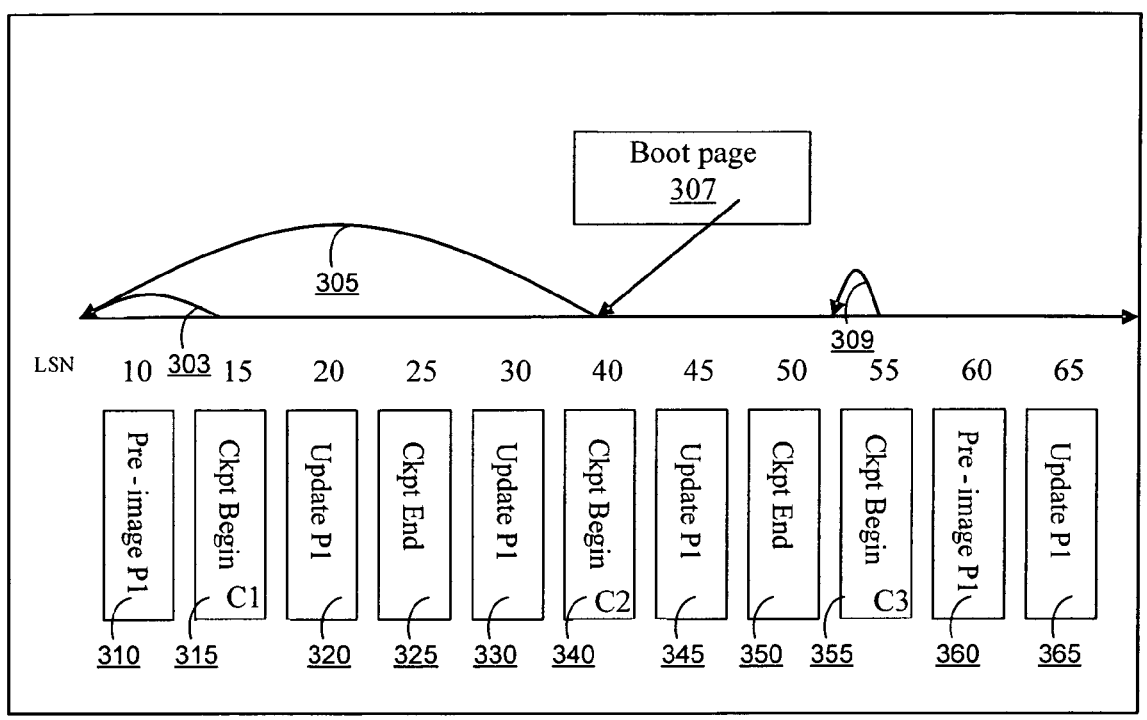
FIG. 3 is a block diagram depicting a state of the log during the checkpoint process.

FIG. 3 is a block diagram depicting the log during the checkpoint process. As shown in FIG. 3, an update is made to P1, resulting in pre-image log record 310 with LSN 10. In this case, before any update record is written, a checkpoint C1 is initiated resulting in a begin checkpoint log record 315 with LSN 15. This initiation is unrelated to the update, but occurs at the same time as the update. The update results in update record 320 with LSN 20. The checkpoint C1 ends, resulting in checkpoint end 325, LSN 25. Another update then occurs to P1. Because the pre-image log record 310 is part of the active log, no new pre-image log record needs to be added to the log. A second update log record 330 is added at LSN 30. A new checkpoint C2 begins resulting in checkpoint begin log record 340 at LSN 40 and checkpoint end log record 350 at LSN 50. Again, a change is made to P1 during the checkpoint, resulting in a third update log record 345 at LSN 45. Checkpoints C1 and C2 indicate the active log during as of those checkpoints by pointing to the log truncate record before LSN 10 as shown by arrows 303 and 305.

After checkpoint C2 ends, a third checkpoint C3 occurs. This is a truncating checkpoint. Because of this, when a fourth change is made to P1, reflected in update log record 365, this update log record no longer relies on pre-image log record 310. Instead, before update log record 365 is written to the log 300, a new pre-image is stored in pre-image log record 360. Because checkpoint C3 has not yet ended, the boot page 307 points to the last successful checkpoint's beginning. This is C2's begin checkpoint record 340. Because checkpoint C3 is a truncating checkpoint, its truncate checkpoint pointer 309 shows that the active log begins with checkpoint begin log record 355 the begin checkpoint log record for C3.

Lazy Writing

The lazy writer scans the buffer pool and pages that have not been referenced since the previous scan are removed from the pool and the buffer is added to the free list to be used to read other pages from disk. If the page to be removed has been dirtied, the lazy writer must write that to disk before removing the page. In deciding to write a page, the lazy writer will follow the same rule as the checkpoint—do not write the page unless its pre-image in log is on disk. Lazy writing occurs, in one embodiment, according to the logic in the pseudocode of Table 3:

TABLE 3

Lazy-writing Logic acquire page latch in exclusive mode;
if (dirty) {
    acquire log semaphore in share mode;
    if (pre-image LSN < flush LSN) {
        release log semaphore;
        write the page;
        clear the dirty flag;
    }
else TABLE 3-continued Lazy-writing Logic release log semaphore;
}
release the page latch;

As shown in Table 3, the page latch is acquired in exclusive mode. If the page is dirty, the log semaphore is acquired in share mode and a determination is made as to whether the pre-image has been flushed. If it has, the log semaphore is released, and the page is written. The dirty flag is then cleared. If the pre-image has not been flushed, then the page is not written and it is not removed from the buffer pool. The log semaphore is released. Either way, the page latch is then released.

Recovery/Restart Processing

The recovery scheme is a variation of the ARIES recovery scheme discussed above. Redo and undo passes occur in a manner different from these passes in the ARIES scheme. According to the invention, the redo pass is entirely driven by the contents of the log, with no regard to what is in the database pages at the time of the crash. Thus, unlike the ARIES recovery scheme, according to one embodiment of the invention there is no separate analysis pass. While the analysis pass in the ARIES scheme also functions to create a list of active transactions, according to one embodiment of the invention, such an active transaction table is created during the redo pass.

However, according to another embodiment of the invention, the active transaction table is created during an initial analysis pass. This embodiment allows support for bringing the database system online before the undo pass.

At restart recovery, we first read the boot page to find the last successful checkpoint's begin log record. The checkpoint log record contains the truncate LSN which marks the beginning of the active log. Flush LSN is initialized to the LSN of the begin-checkpoint log record. Then the redo pass is performed, and then the undo pass.

For the redo pass, the active log is examined. Each pre-image encountered in the active log is laid down. For each page for which a pre-image is encountered, changes to the page recorded in update log records corresponding to the page are applied. As described above, in this pass, according to some embodiments, active transaction information is also tracked and stored. Additionally, information regarding the pre-images encountered is tracked. In some embodiments, the redo pass examines the log sequentially in forwards-chronological order, beginning at the beginning of the active log. However, in other embodiments, multiple log records may be examined at once, as long as changes to a single page are applied sequentially in the order in which the corresponding log pages are found in the log.

During this redo pass, if an update log record relating to a page is seen before a pre-image log record containing the page's pre-image, then the update log record is ignored because either the page on disk already has the change or there will be a pre-image later in the log that contains this change.

At the time of a crash, some of the data pages may be in the middle of an I/O and may have been torn. Each such page will have its pre-image in the log (because we would not have written a page unless its pre-image is on disk). Since redo entirely runs off what is in the log, those pages will be reconstructed using the pre-images.

The redo pass occurs, in one embodiment, according to the logic in the pseudocode of Table 4:

TABLE 4

Redo pass Logic

```
starting from the truncate LSN, process the log records till end of
the log;
for (each log record) {
    switch (log record type) {
    case begin transaction log record:
        add the transaction to the transaction table;
        break;
    case end transaction log record:
        remove transaction from the transaction table;
        break;
    case pre-image log record:
        if (page is found in the pre-image table)
            replace the LSN in the table's entry with the pre-image LSN;
        else
            create a table entry for the page with the pre-image LSN;
            if (page is already in the buffer pool)
                assert the buffer pool's page and the pre-image are
                    identical;
            else
                install the pre-image in the buffer pool;
            set the pre-image LSN in buffer header to the pre-image LSN;
            mark the page dirty;          // see below for the reason.
        break;
    case page update log record:
        if (page is not in the pre-image page table) {
            assert the log record LSN < checkpoint begin LSN;
            ignore the log record;
        }
        else if (the page is found in the buffer pool) {
            assert page LSN == old LSN in the log record;
            redo the change to the page and mark it dirty;
        }
        else {
            read the page from disk;
            assert it is not a torn page;      // see below for the reason.
            assert page LSN == old LSN in the log record;
            set pre-image LSN to that found in the pre-image table;
            redo the change to the page and mark it dirty;
        }
        break;
    }
}
```

As shown in Table 4, the log is examined, from the truncate LSN to the end of the log, in forward-chronological order. For each log record, an appropriate action is taken. A table of open transactions is created by putting each transaction for which a begin transaction log record is found into the table, and then taking it out if an end transaction record is found.

A table of pre-image log record locations is also created. Where a pre-image log record is found, the pre-image LSN is placed into the pre-image log record table (if it was not there) or the entry for the page updated in the pre-image LSN table. The pre-image page table is discarded at the end of redo but the active transaction table is used in the next phase—the undo pass.

Where a pre-image log record is found, if the pre-image is in the buffer pool, it should be identical to the pre-image in the pre-image log record. If the pre-image log record is not in the buffer pool, it is installed there. The value for pre-image LSN in the buffer header for the page is set to the LSN of the pre-image log record. The page is marked dirty. If the page is not marked dirty, then it can be removed from the buffer pool, and updates can not be applied to the buffered pre-image page. Since the page on disk may be corrupt or a future version, this can cause inconsistencies in the recovery. Because the page is marked dirty, it will not be removed from the buffer pool without getting written out, and thus this inconsistency is avoided.

Where an update log record is found, the pre-image page table is examined to see if the corresponding pre-image log record has been encountered. If it hasn't, the log record can be ignored. If it has, and the corresponding page is in the buffer pool, the LSN of the pre-image in the buffer pool is checked against the stored pre-image LSN in the update log record, it is asserted that they are is consistent. The change is performed on the page. Since the page has already been marked as dirty, when the pre-image log record was found, it is not necessary to mark the page as dirty, however, in some embodiments a redundant marking of the page as dirty is performed.

When the corresponding page is in the pre-image page table, but the page is not in the buffer pool, the page is read from disk. Because this page is in the pre-image table, it must have been written to disk during recovery, so it can be asserted that it is not a torn page. The LSN of the page read from disk is checked against the stored pre-image LSN in the update log record, it can be asserted that they are identical. The pre-image LSN in the buffer header is set to that pre-image LSN found in the pre-image page table. The change is performed on the page, which is marked dirty in order to ensure that it will not be removed from the buffer without getting written out.

In one embodiment, in order to determine the end of the log for the redo pass, the parity bits in the headers of the adjacent sectors containing the log are compared. To account for non-atomic write of a multi-sector log block, when a partially written log block is seen, the end of the log is set to be the previous log block. However, before reusing the log, the partially written log blocks must be cleaned up. In fact, there may be other log blocks that are beyond the end of the log. If they are not cleaned up, they may be confused with the blocks of the new log. To avoid this problem, according to one embodiment, a pre-specified amount of said log is cleaned up. In this embodiment, the size of the log between two consecutive checkpoints is guaranteed to be less than this pre-specified amount. Since each checkpoint does a Flush-Cache, the upper bound on the number of active transactions can be based on the maximum amount of log generated between checkpoints.

In ARIES, the redo pass begins at or later than the begin checkpoint LSN and makes use of the log to avoid reading pages from disk redundantly where the page already has the change. However, according to the invention, while pre-images prior to a certain point are on disk, WAL is followed only for pre-image records. Thus there may be database pages on disk for which some of the log records may not have made to disk. If the redo pass proceeds as in ARIES, some pages may be left with transactionally inconsistent changes. Instead, by starting from the truncate LSN and installing the pre-images from the log into the database, the redo pass ignores what is in the data pages at the time of the crash. Since a data page will not be in IO without its pre-image in the log, all those data pages will be properly redone.

Undo Pass

For each active transaction, we undo the changes in the log entries. In one embodiment, the log entries are undone in reverse chronological order. In other embodiments, log entries are undone in any order, or in parallel, with the constraint that the log entries pertaining to a specific page are undone in reverse order of the appearance of the log entries in the log. Since pre-image log records do not belong to a specific transaction, they are skipped. The page update is performed in the same way as a forward-going change except a CLR is generated. Just as in the forward-going case, pre-image log records may be generated during undo.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for controlling a disk storage of a computing device by way of a relational database, said method comprising:
    recoverably updating the relational database with a change to a portion of said relational database to control the disk storage by:
    acquiring a log semaphore in a share mode, the log semaphore being a newly created synchronization point in an active portion of a recovery log comprising log records and stored on the disk storage;
    determining whether a copy of said portion of said database is not stored on the active portion of the recovery log on the disk storage;
    if a copy of said portion of said database is not stored on said active portion of said recovery log, releasing said log semaphore and adding to said recovery log on the disk storage a pre-image log record comprising a copy of said portion of said database on the disk storage before said change, otherwise releasing said log semaphore;
    adding to said recovery log on the disk storage an update log record comprising information about said change; and
    updating said database on the disk storage to reflect said change, wherein a plurality of different pages may be updated concurrently, the log semaphore in the recovery log on the disk storage allowing the recovery log on the disk storage to be shared between an updater performing the updating and a checkpoint periodically performing maintenance operations on the recovery log on the disk storage.

2. The method of claim 1, where said database is stored on a storage medium comprising cache storage and second storage, and where said method further comprises:
    requesting of said storage medium that data in said cache be written to said second storage.

3. The method of claim 2, where a flush log sequence number is tracked, and where said step of requesting that data in said cache be written to said second storage comprises updating said flush log sequence number.

4. The method of claim 2, where said active portion of said recovery log is determined with reference to a truncation sequence number, and where said step of requesting that data in said cache be written to said second storage comprises:
    determining if said truncation sequence number should be updated; and
    if said truncation sequence number should be updated, updating said truncation sequence number.

5. The method of claim 1, where said change to a portion of said database comprises an update of said database.

6. The method of claim 1, where said change to a portion of said database comprises a rollback of a transaction in said database.

7. The method of claim 6, where said update log record is marked to indicate that said update log record is associated with rollback.

8. The method of claim 1, where said portion comprises a database page.

9. A system for controlling a disk storage of a computing device by way of a relational database, said relational database comprising pages of database data, said system recoverably updating the relational database with a change to a portion of said relational database to control the disk storage and comprising:
    a storage cache of the disk storage for temporarily storing one or more of said pages;
    a second storage on the disk storage comprising storage for storing said pages;
    acquiring a log semaphore in a share mode, the log semaphore being a newly created synchronization point in a recovery log on the disk storage;
    a log storage on the disk storage for storing the recovery log, said recovery log comprising sequential log records, said log records comprising, for a change made to a specific one of said pages, a pre-image log record comprising a copy of said page before said change, and an update log record corresponding to said change, said update log record comprising information about said change; and
    releasing said log semaphore, wherein a plurality of different pages may be updated concurrently, the log semaphore in the recovery log allowing the recovery log to be shared between an updater performing the updating and a checkpoint periodically performing maintenance operations on the recovery log.

10. The system of claim 9, further comprising:
    checkpoint logic for issuing a request for data stored in said storage cache to be written to said second storage.

11. The system of claim 10, where said checkpoint logic further determines if said recovery log should be truncated, and, if said recovery log should be truncated, truncates said recovery log.

12. The system of claim 9, further comprising:
    recovery logic for using said recovery log and said second storage to recreate a state of said database.

13. The system of claim 12, where said recovery logic traverses an active set of said log records, and where, for each pre-image record encountered, said recovery logic recreates a state of a page corresponding to said pre-image by using said pre-image, modified as indicated by any update log records corresponding to said page found in successive log records in said active set of said log records.

14. The system of claim 13, where said recovery logic traverses said active set of said log records and, for each update log record found, determines if said update log record corresponds to an active transaction, and if said update log record corresponds to an active transaction, undoes said change corresponding to said update log record.

15. A method for controlling a disk storage of a computing device by way of a relational database, said relational database comprising pages of database data, said method comprising:
- recoverably updating the relational database with a change to a portion of said relational database to control the disk storage by:
- storing pages of said database in a storage cache on the disk storage for temporarily storing one or more of said pages and a second storage on the disk storage comprising storage for storing said pages;
- acquiring a log semaphore in a share mode, the log semaphore being a newly created synchronization point in a recovery log stored on the disk storage;
- maintaining the recovery log on the disk storage, said recovery log comprising sequential log records, said log records comprising, for a change made to a specific one of said pages, a pre-image log record comprising a copy of said page before said change, and an update log record corresponding to said change, said update log record comprising information about said change; and
- releasing said log semaphore, wherein a plurality of different pages may be updated concurrently, the log semaphore in the recovery log allowing the recovery log to be shared between an updater performing the updating and a checkpoint periodically performing maintenance operations on the recovery log.

16. The method of claim 15, further comprising:
- issuing a request for data stored in said storage cache to be written to said second storage.

17. The method of claim 15, further comprising:
- determining if said recovery log should be truncated, and, if said recovery log should be truncated, truncating said recovery log.

18. The method of claim 15, further comprising:
- recovering a prior state of said database using said recovery log and said second storage.

19. The method of claim 18, where said recovering a prior state comprises:
- traversing an active set of said log records; and
- for each pre-image record encountered in said traversing, recreating a state of a page corresponding to said pre-image by using said pre-image, modified as indicated by any update log records corresponding to said page found in successive log records in said active set of said log records.

20. The method of claim 19, where said recovering a prior state further comprises:
- traversing said active set of said log records;
- for each update log record found, determining if said update log record corresponds to an active transaction; and
- if said update log record corresponds to an active transaction, undoing said change corresponding to said update log record.

* * * * *